(12) United States Patent
Katagiyama et al.

(10) Patent No.: US 7,484,898 B2
(45) Date of Patent: Feb. 3, 2009

(54) OPTICAL CONNECTOR EXCELLENT IN MAINTENANCE OF A CONNECTED STATE

(75) Inventors: Naoki Katagiyama, Tokyo (JP); Yuichi Koreeda, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/999,546

(22) Filed: Dec. 6, 2007

(65) Prior Publication Data

US 2008/0138016 A1 Jun. 12, 2008

(30) Foreign Application Priority Data

Dec. 12, 2006 (JP) ............... 2006-334694

(51) Int. Cl.
*G02B 6/38* (2006.01)
(52) U.S. Cl. ............... 385/62; 385/88; 385/89; 385/92
(58) Field of Classification Search ............ 385/62, 385/92, 88, 89
See application file for complete search history.

(56) References Cited

U.S. PATENT DOCUMENTS

| | | | |
|---|---|---|---|
| 6,435,728 B2 * | 8/2002 | Shimoji et al. | 385/56 |
| 6,454,464 B1 * | 9/2002 | Nolan | 385/60 |
| 6,533,603 B1 * | 3/2003 | Togami | 439/372 |
| 6,872,010 B1 * | 3/2005 | Bianchini | 385/92 |
| 6,881,095 B2 * | 4/2005 | Murr et al. | 439/607 |
| 7,090,523 B2 * | 8/2006 | Shirk et al. | 439/352 |
| 7,212,410 B2 * | 5/2007 | Larson | 361/726 |
| 7,303,336 B2 * | 12/2007 | Kayner et al. | 385/55 |
| 7,347,711 B1 * | 3/2008 | Bianchini et al. | 439/357 |

FOREIGN PATENT DOCUMENTS

| | | |
|---|---|---|
| JP | 9043453 | 2/1997 |
| JP | 11237527 | 8/1999 |
| JP | 2006-179633 | 7/2006 |
| JP | 2006-189633 | 7/2006 |

* cited by examiner

*Primary Examiner*—James P Hughes
(74) *Attorney, Agent, or Firm*—Collard & Roe, P.C.

(57) ABSTRACT

An optical connector included a ferrule defining an optical axis and a holding member holding the ferrule. The ferrule includes a flange portion having a positioned portion. The holding member includes a first and a second beam portions faced to each other, a third beam portion adjacent to the first and the second beam portions, and a fourth beam portion faced to the third beam portion. At least one of the first and the second beam portions has elasticity. At least one of the third and the fourth beam portions has elasticity. At least one of the first and the second beam portions includes a contacting portion contacted with the flange portion in an optical axis direction and holding the ferrule. At least one of the third and the fourth beam portions includes a positioning portion engaged with the positioned portion to prevent the ferrule from being rotated.

9 Claims, 7 Drawing Sheets

OPTICAL CONNECTOR EXCELLENT IN MAINTENANCE OF A CONNECTED STATE

This application is based upon and claims the benefit of priority from Japanese patent application No. 2006-334694, filed on Dec. 12, 2006, the disclosure of which is incorporated herein in its entirety by reference.

BACKGROUND OF THE INVENTION

This invention relates to an optical connector including a ferrule defining an optical axis and a holding member for holding the ferrule.

Japanese Unexamined Patent Application Publication (JP-A) No. H11-237527 discloses an optical connector comprising a ferrule assembly composed of a ferrule connected to an optical fiber, a flange portion for holding the ferrule, and a spring, and a housing containing the ferrule assembly. However, the optical connector is disadvantageous with respect to the size and the number of assembling steps because the optical connector comprises a large number of components.

Japanese Unexamined Patent Application Publication (JP-A) No. 2006-189633 discloses an optical connector apparatus comprising a ferrule holding an optical fiber, an elastic member urging the ferrule in a fitting direction, and a receiving portion receiving and holding the ferrule and the elastic member. However, since the elastic member for urging the ferrule is used, the optical connector apparatus is disadvantageous in view of space saving and cost reduction. When the optical connector is assembled, it is difficult to incorporate the elastic member and a number of assembling steps are required. Once the ferrule is incorporated, it is impossible to exchange the elastic member unless the ferrule is removed or the optical fiber is cut off.

Further, Japanese Unexamined Patent Application Publication (JP-A) No. H9-43453 discloses an optical connector apparatus in which a ferrule can be pulled out without requiring a special tool. Specifically, by pushing a holding element, a pressing portion formed on a beam portion of the holding element expands an elastic engaging claw so that the optical connector is allowed to be pulled out. However, the optical connector apparatus does not have a mechanism or part for inhibiting rotation of the ferrule. Therefore, when the optical connector is pulled out, the ferrule is rotated so that characteristics are not stabilized.

SUMMARY OF THE INVENTION

It is therefore an exemplary object of this invention to provide an optical connector excellent in maintenance of a connected state.

It is another exemplary object of this invention to provide an optical connector capable of inhibiting rotation of a ferrule and maintaining a stable performance.

It is still another exemplary object of this invention to provide an optical connector which can be reduced in size.

Other objects of the present invention will become clear as the description proceeds.

According to an exemplary aspect of the present invention, there is provided an optical connector comprising a ferrule defining an optical axis and a holding member holding the ferrule, wherein the ferrule includes a flange portion having a positioned portion, the holding member including, a first beam portion, a second beam portion faced to the first beam portion, a third beam portion adjacent to the first and the second beam portions, and a fourth beam portion faced to the third beam portion, at least one of the first and the second beam portions having elasticity, at least one of the third and the fourth beam portions having elasticity, at least one of the first and the second beam portions including a contacting portion contacted with the flange portion in an optical axis direction parallel to the optical axis and holding the ferrule, at least one of the third and the fourth beam portions including a positioning portion engaged with the positioned portion to prevent the ferrule from being rotated.

DESCRIPTION OF THE EXEMPLARY EMBODIMENT

Referring to FIGS. 1 to 4, description will be made of an optical connector according to an exemplary embodiment of this invention.

Figure 1:
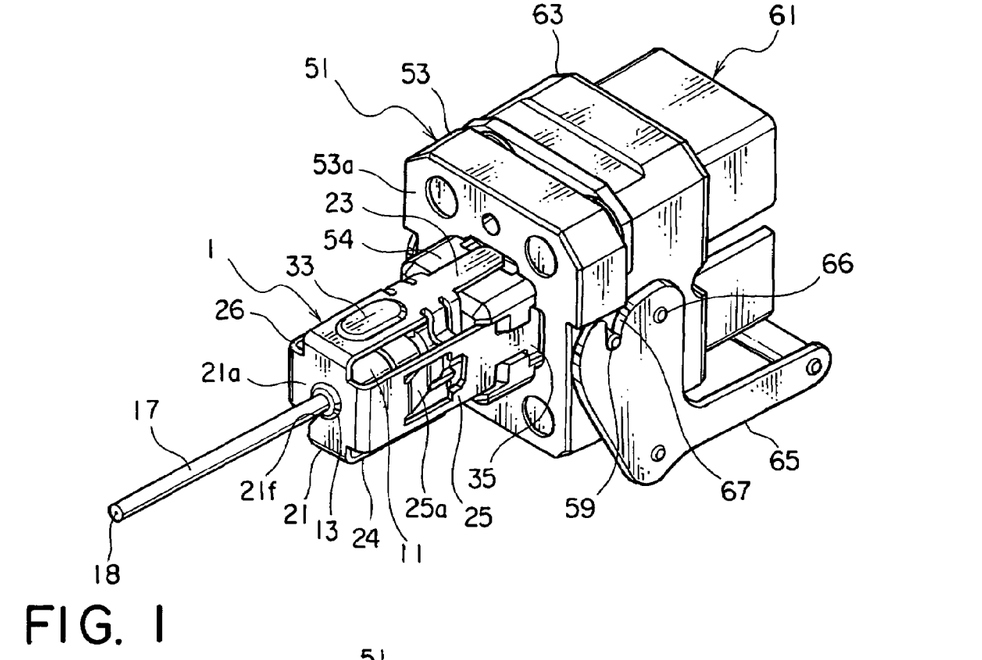
FIG. 1 is a perspective view of an optical connector according to an exemplary embodiment of this invention in a connected state, together with an optical cable, a housing, and an adapter.
Figure 2:
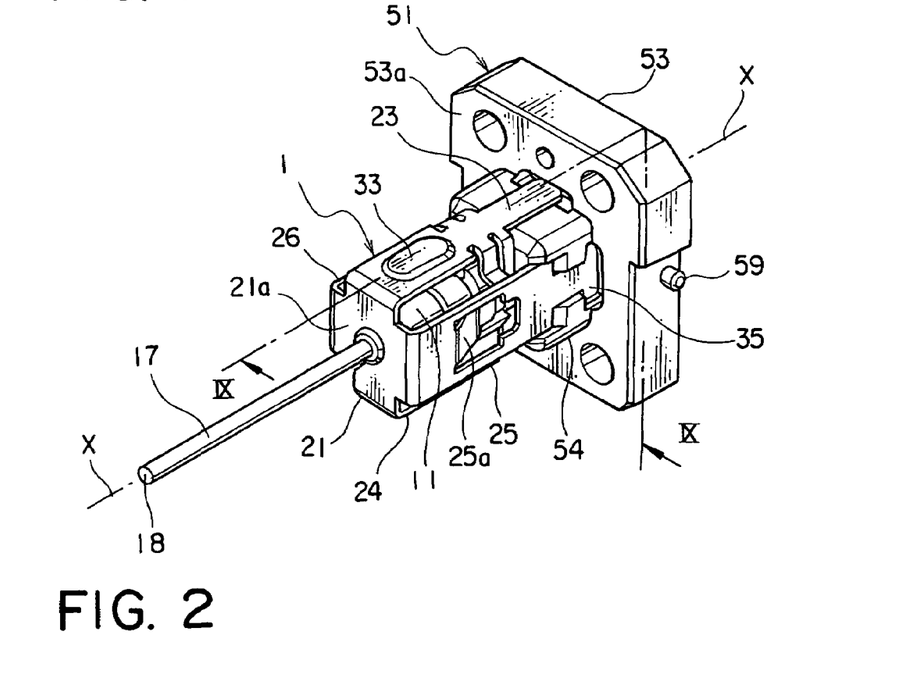
FIG. 2 is a perspective view of the optical connector and the housing illustrated in FIG. 1 in the connected state.

The optical connector is depicted by a reference numeral 1. The optical connector 1 is mounted to and held by a housing 51 and is connected to a mating optical connector (not shown) through an adapter 61 coupled to the housing 51. A combination of the optical connector 1 and the housing 51 will herein be called an optical connector apparatus.

Figure 4:
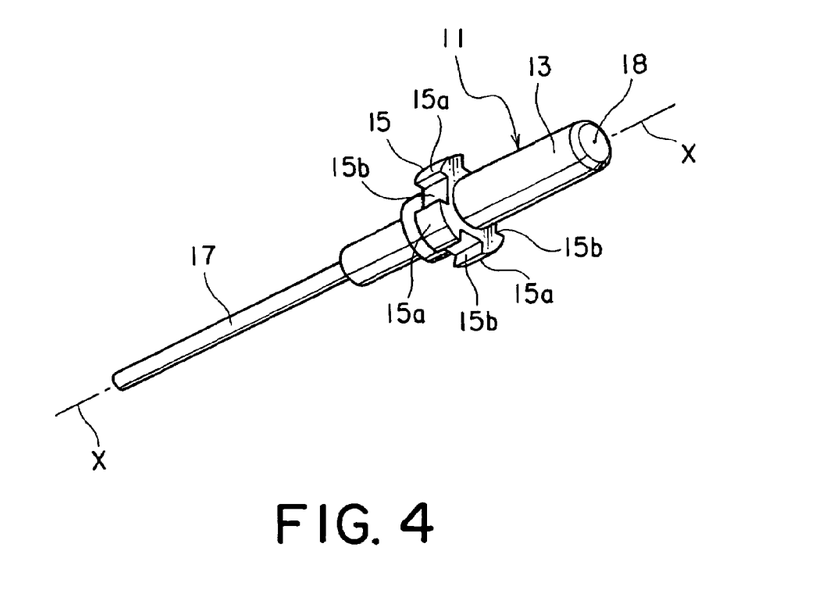
FIG. 4 is a perspective view of a ferrule of the optical connector illustrated in FIG. 1 when the optical cable is connected thereto.
Figure 5:
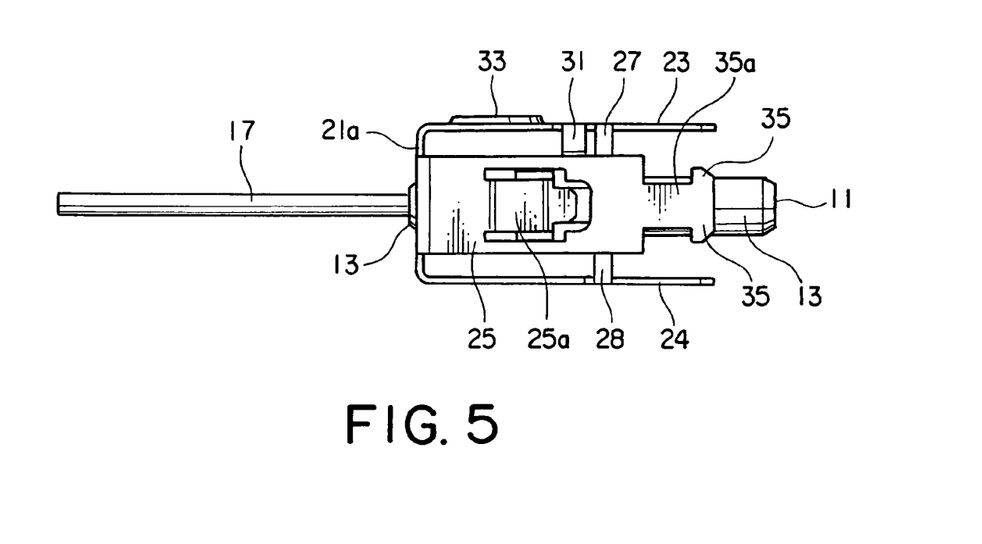
FIG. 5 is a right side view of the optical connector illustrated in FIG. 3.
Figure 6:
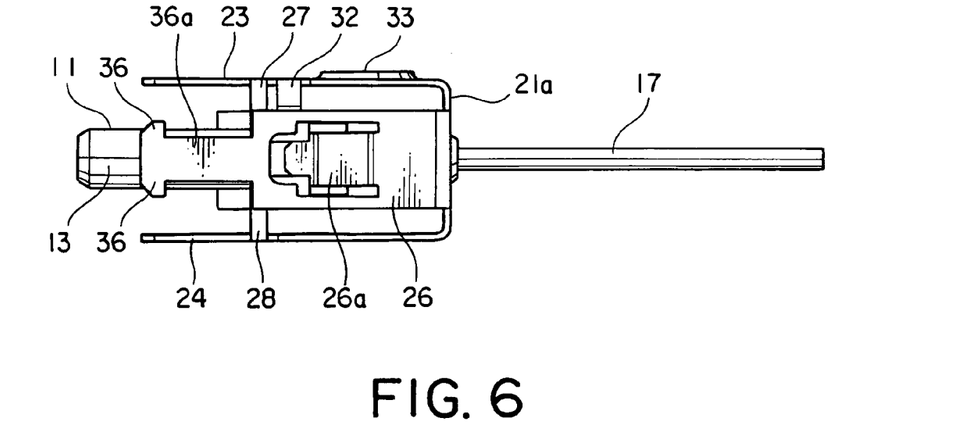
FIG. 6 is a left side view of the optical connector illustrated in FIG. 3.

The optical connector 1 has a ferrule 11 and a holding member 21 for holding the ferrule 11. The ferrule 11 comprises a cylindrical ferrule body 13, and a flange portion 15 formed at an intermediate portion of the ferrule body 13 in a direction along an optical axis X extending in a predetermined direction (hereinafter will be called an optical axis X direction). The flange portion 15 is formed on an outer peripheral surface of the ferrule body 13 and extends outward in a plane perpendicular to the optical axis X. The flange portion 15 has an outer peripheral surface 15a around the optical axis X and a plurality of positioned portions 15b formed by cutting out a plurality of points of the outer peripheral surface 15a.

Thus, the outer peripheral surface 15a of the flange portion 15 is formed by a plurality of arc-shaped surfaces intermittently arranged in a circumferential direction.

One end of an optical cable 17 is inserted into the ferrule body 13 from its one end in the optical axis X direction. The one end of the optical cable 17 after inserted is held in the ferrule body 13. The optical cable 17 comprises an optical fiber 18 coated with a resin material. Further, at the other end of the ferrule body 13, an end face of the optical fiber 18 inserted into the ferrule body 13 is exposed. Upon connection, the end face of the optical fiber 18 is butted against an end face of an optical fiber of the mating optical connector.

Referring to FIGS. 5 to 8 in addition, the holding member 21 will be described.

Figure 7:
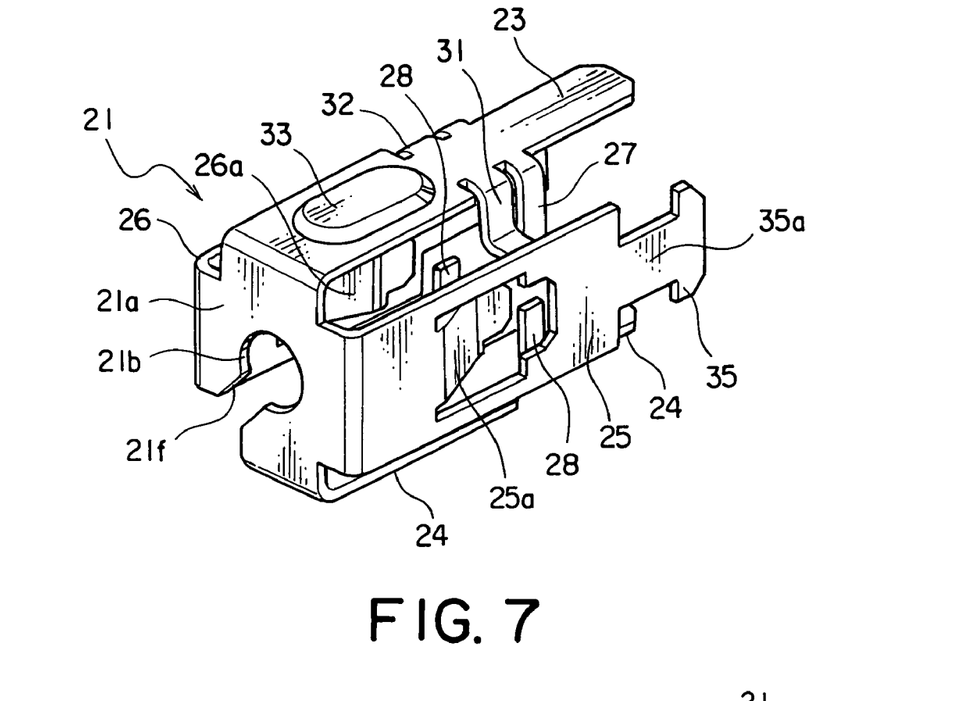
FIG. 7 is a perspective view of a holding member of the optical connector illustrated in FIG. 1.
Figure 8:
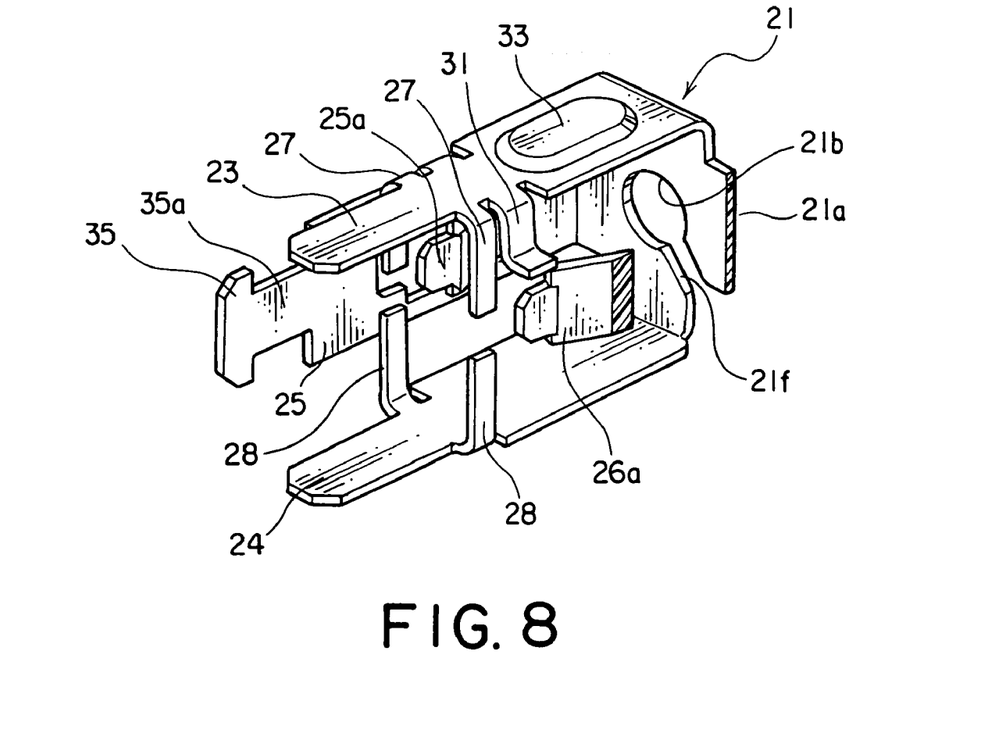
FIG. 8 is a partially-cutaway sectional perspective view of the holding member illustrated in FIG. 7.

The holding member 21 has a base portion 21a of a generally rectangular plate-like shape extending in a plane perpendicular to the optical axis X, and first through fourth beam portions 23, 24, 25, and 26 of a long plate-like shape extending to direct a sense similar to each other from four sides of the base portion 21a in the optical axis X direction, respectively. The first and the second beam portions 23 and 24 are faced to each other. The third and the fourth beam potions 25 and 26 are faced to each other. The third beam portion 25 is arranged on one side of the first and the second beam portions 23 and 24 and adjacent to the first and the second beam portions 23 and 24. The fourth beam portion 26 is arranged on the other side of the first and the second beam portions 23 and 24 and adjacent to the first and the second beam portions 23 and 24. Each of the first through the fourth beam potions 23, 24, 25, and 26 has elasticity in a thickness direction.

The holding member 21 has, as a receiving portion for receiving the ferrule 11, a portion surrounded by the base portion 21a and the first through the fourth beam portions 23, 24, 25, and 26. The first beam portion 23 is provided with a pair of first contacting portions 27. The first contacting portions 27 are connected to two sides of the first beam portion 23 parallel to the optical axis X and bent in a direction generally perpendicular to the first beam portion 23. The second beam portion 24 is provided with a pair of second contacting portions 28. The second contacting portions 28 are connected to two sides of the second beam portion 24 parallel to the optical axis X and bent in a direction generally perpendicular to the second beam portion 24.

The first and the second contacting portions 27 and 28 extend towards each other so that their ends are faced to each other. The first and the second contacting portions 27 and 28 are contacted with the flange portion 15 of the ferrule 11 in the optical axis X direction and serve to hold the ferrule 11. The third and the fourth beam portions 25 and 26 serve to continuously elastically hold the ferrule body 13 towards the optical axis X.

The holding member 21 may be formed only by a single thin plate material. When a metal plate is used as the plate material, the holding member 21 may be formed by punching the metal material into a predetermined spread or flat or two-dimensional shape using a press and then bending the metal material into a desired shape. It is noted here that only one of the first and the second beam portions 23 and 24 may have elasticity and that only one of the third and the fourth beam portions 25 and 26 may have elasticity.

The third beam portion 25 is provided with a first positioning portion 25a of a cantilevered shape having elasticity. The first positioning portion 25a has one end near the base potion 21a and the other end as a free end. The one end of the first positioning portion 25a is connected to the third beam portion 25 and the free end extends inward of the third beam portion 25. The fourth beam portion 26 is provided with a second positioning portion 26a of a cantilevered shape having elasticity. The second positioning portion 26a has one end near the base potion 21a and the other end as a free end. The one end of the second positioning portion 26a is connected to the fourth beam portion 26 and the free end extends inward of the fourth beam portion 26.

The first and the second positioning portions 25a and 26a are engaged with the positioned portions 15b formed on the flange portion 15 of the ferrule 11 and hold the ferrule 11 to thereby prevent the ferrule 11 from rotating or inclining in a direction intersecting the optical axis X. Although both of the first and the second positioning portions 25a and 26a have elasticity, only one of them may have elasticity.

Further, the first beam portion 23 is provided with first and second operating portions 31 and 32 having elasticity. The first operating portion 31 is bent from the first beam portion 23 to extend in a direction perpendicular to a plate surface of the first beam portion 23 and is further bent to face a plate surface of the third beam portion 25. The second operating portion 32 is bent from the first beam portion 23 to extend in a direction perpendicular to the plate surface of the first beam portion 23 and is further bent to face a plate surface of the fourth beam portion 26.

The first and the second operating portions 31 and 32 are arranged adjacent to the first contacting portions 27, respectively, and, near the base portion 21a, are contacted with the outer peripheral surface 15a of the flange portion 15 of the ferrule 11. The first and the second operating portions 31 and 32 expand or widen the third and the fourth beam portions 25 and 26 outward to disengage the positioned portions 15b of the flange portion 15 of the ferrule 11 and the first and the second positioning portions 25a and 26a of the third and the fourth beam portions 25 and 26 of the holding member 21 from each other.

The first and the second operating portions 31 and 32 may be formed on only one of the first and the second beam portions 23 and 24. The first and the second operating portions 31 and 32 may be contacted with the outer peripheral surface 15a of the flange portion 15 when they are operated.

The third beam portion 25 has a free end provided with a third neck portion 35a narrower in width than the third beam portion 25 and a pair of first coupling portions 35 connected to the third neck portion 35a and protruding from an end of the third neck portion 35a in a widthwise direction. As is clear from FIG. 6, the fourth beam portion 26 has a free end provided with a fourth neck portion 36a narrower in width than the fourth beam portion 25 and a pair of second coupling portions 36 connected to the fourth neck portion 36a and protruding from an end of the fourth neck portion 36a in a widthwise direction. The third neck portion 35a of the third beam portion 25 is shorter in length in the optical axis X direction than the fourth neck portion 36a of the fourth beam portion 26.

The base portion 21a of the holding member 21 is provided with a through hole 21b for receiving one end portion of the ferrule body 13 with the optical cable 17 inserted therein. The one end portion of the ferrule body 13 penetrates the through hole 21b to be held in the through hole 21b. The base portion 21a is provided with a cutout portion 21f formed by cutting out one side of the base portion 21a from the through hole 21b.

Figure 9:
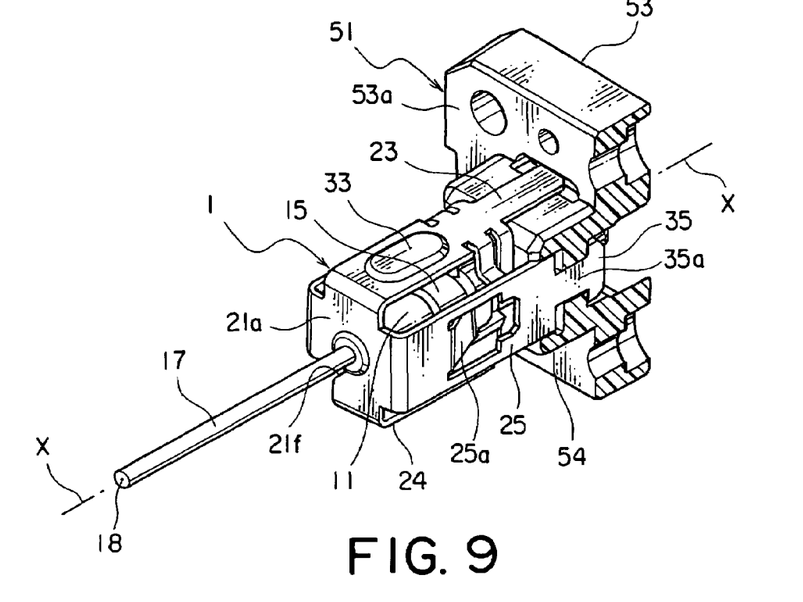
FIG. 9 is a sectional view taken along a line IX-IX in FIG. 2.
Figure 10:
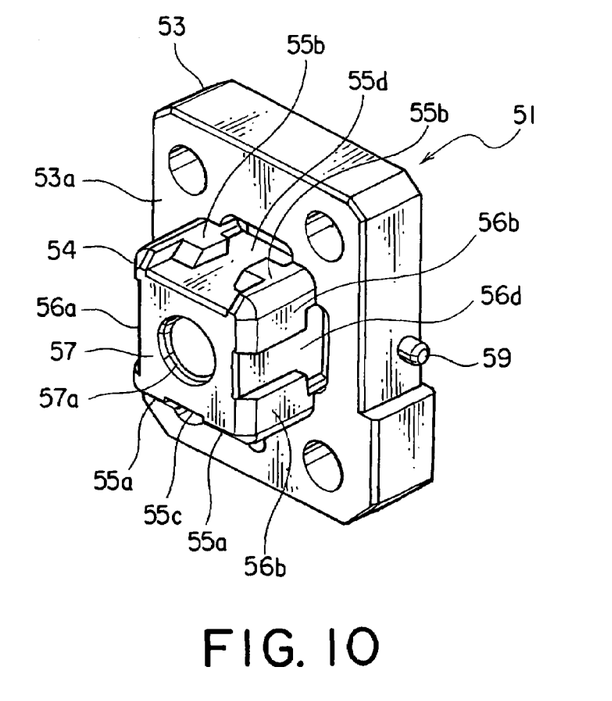
FIG. 10 is a perspective view of the housing illustrated in FIG. 3 when it is rotated by 180 degrees.

Referring to FIGS. 9 and 10 in addition, description will proceed.

The housing 51 has a housing body 53 of a generally rectangular plate-like shape, and a fitting portion 54 of a generally rectangular plate-like shape protruding from one surface 53a of the housing body 53. As best shown in FIGS.

Figure 3:
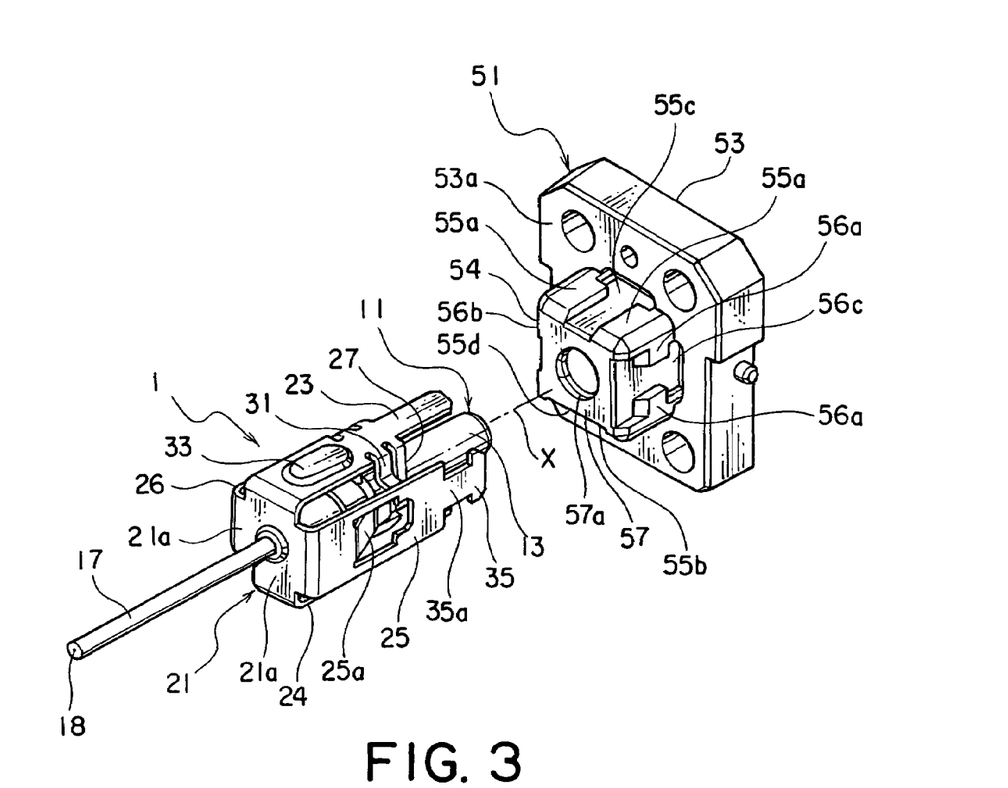
FIG. 3 is a perspective view of the optical connector and the housing illustrated in FIG. 1 in an unconnected state.

3 and 10, the fitting portion 54 has a first side surface 55a, a second side surface 55b faced to the first side surface 55a, third and fourth side surfaces 56a and 56b adjacent to the first and the second side surfaces 55a and 55b, and a fitting surface 57 parallel to the one surface 53a of the housing body 53.

The first side surface 55a is provided with a first groove portion 55c having a bottom surface lower in level than the first side surface 55a. The first groove portion 55c receives a free end of the first beam potion 23 of the holding member 21 and has a shape corresponding to the first beam portion 23. The second side surface 55b is provided with a second groove portion 55d having a bottom surface lower in level than the second side surface 55b. The second groove portion 55d receives a free end of the second beam portion 24 of the holding member 21 inserted therein and has a shape corresponding to the second beam portion 24.

The third side surface 56a is provided with a third groove portion 56c having a bottom surface lower in level than the third side surface 56c. The third groove portion 56c serves as a lock portion adapted to receive and lock the free end of the third beam portion 25 of the holding member 21 and has a shape corresponding to the first coupling portion 35. The fourth side surface 56b is provided with a fourth groove portion 56d having a bottom surface lower in level than the fourth side surface 56b. The fourth groove portion 56d is different in shape from the third groove portion 56c. The fourth groove portion 56d serves as a lock portion adapted to receive and lock the free end of the fourth beam portion 26 of the holding member 21 and has a shape corresponding to the second coupling portion 36.

The fitting portion 54 is provided with an insertion hole 57a extending from a center part of the fitting surface 57 of the fitting portion 54 towards the housing body 53 through the ferrule body 13 of the ferrule 11. The housing body 53 is provided with a housing hole (not shown) for insertion of the one end portion of the ferrule body 13 inserted through the insertion hole 57a.

As shown in FIG. 1, the adapter 61 has an adapter housing 63 contacted with the other surface of the housing body 53 opposite to the one surface 53a. The adapter housing 63 has a pair of side surfaces between which a lever member 65 is rotatably coupled to a lever shaft portion 66. The lever member 65 has lever cutout portions 67 engaged with shaft portions 59 formed on a pair of side surfaces of the housing body 53. In a state where the housing body 53 is contacted with the adapter housing 63, the lever member 65 is rotated in a predetermined direction (clockwise direction in FIG. 1). Then, the housing 51 is coupled to the adapter 61.

Hereinafter, description will be made of assembling of the optical connector 1 and the optical connector apparatus.

Figure 11:
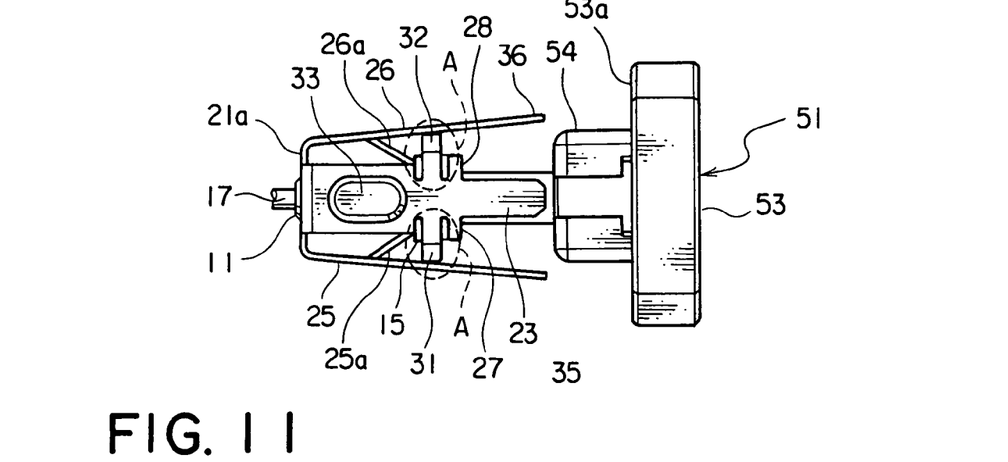
FIG. 11 is a plan view of the optical connector illustrated in FIG. 3 before it is fitted to the housing.

In order to incorporate the ferrule 11 into the holding member 21, the third and the fourth beam portions 25 and 26 are opened away from each other as illustrated in FIG. 11. Then, the ferrule 11 is received in a space between the first and the second positioning portions 25a and 25b which serves as the receiving potion inside the holding member 21. At this time, in order to inhibit rotation of the ferrule 11, the free ends of the first and the second positioning portions 25a and 26a are positioned at the positioned portions 15b of the flange portion 15 of the ferrule 11 (see a part A in FIG. 11).

Figure 12:
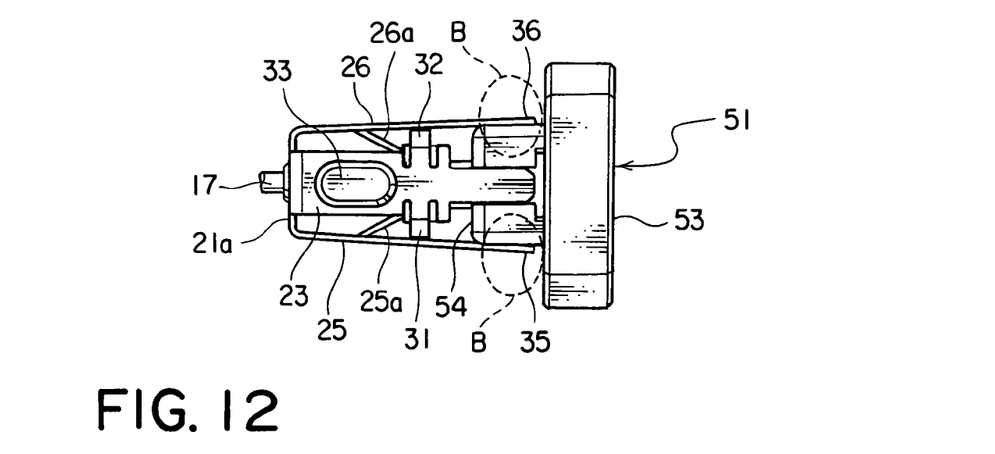
FIG. 12 is a plan view of the optical connector illustrated in FIG. 3 immediately before it is fitted to the housing.
Figure 13:
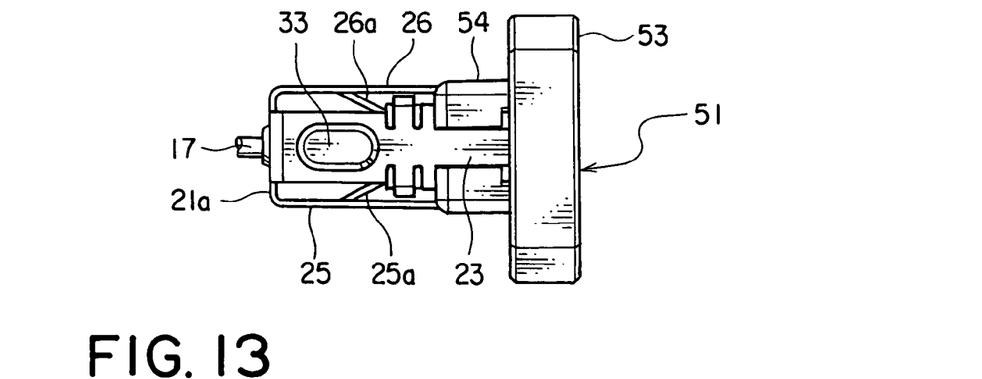
FIG. 13 is a plan view of the optical connector illustrated in FIG. 3 after it is fitted to the housing.

In order to fit the optical connector 1 to the housing 51, a protruding portion 33 formed on the first beam portion 23 is pushed towards the second beam portion 24. Then, the first and the second operating portions 31 and 32 are opened along a circumferential part of the flange portion 15 of the ferrule 11 to move the third and the fourth beam portions 25 and 26 away from each other. When the third and the fourth beam portions 25 and 26 are opened, the first and the second coupling portions 35 and 36 formed at the free ends of the third and the fourth beam portions 25 and 26 are smoothly fitted to the fitting portion 54 of the housing 51 (see a part B in FIG. 12 and FIG. 13). When a pressing force against the protruding portion 33 of the first beam portion 23 is released after fitting, the first and the second operating portions 31 and 32, together with the third and the fourth beam portions 25 and 26, are recovered. The first and the second coupling portions 35 and 36 are inserted into the third and the fourth groove portions 56c and 56d, respectively. Therefore, when the optical connector 1 is fitted to the fitting portion 54, the first and the second coupling portions 35 and 36 are prevented from being released from the third and the fourth groove portions 56c and 56d which serve as the lock portion.

By changing the shape of the free ends of the third and the fourth beam portions 25 and 26 having the first and the second positioning portions 25a and 26a or by changing the shape of the third and the fourth groove portions 56c and 56d, it is possible to prevent improper fitting when the optical connector 1 is coupled to the housing 51.

In order to remove the optical connector 1 from the housing 51, the protruding portion 33 formed on the first beam portion 23 is pushed. Then, like in case where the optical connector 1 is fitted to the fitting portion 54, the third and the fourth beam portions 25 and 26 are moved away from each other. As a result, the first and the second coupling portions 35 and 36 are released from the fitting portion 54 of the housing 51 so that the optical connector 1 can smoothly be removed from the housing 51.

Figure 14:
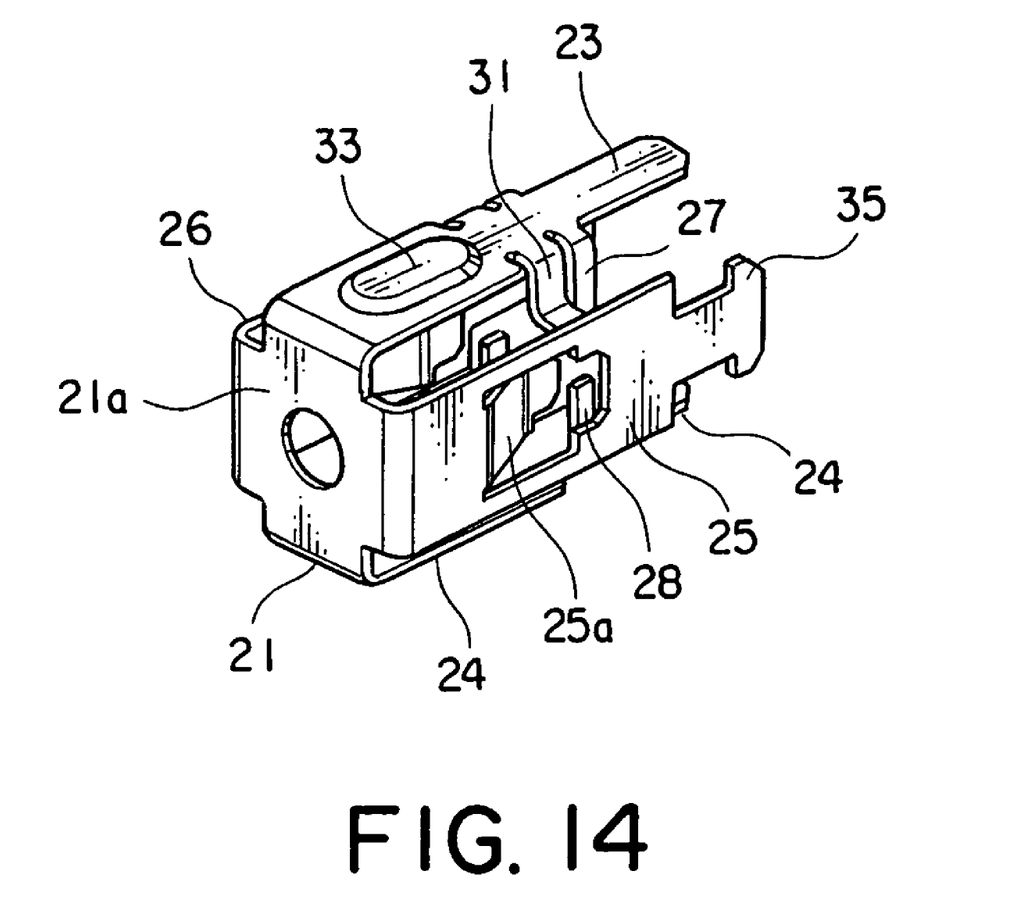
FIG. 14 is a perspective view showing a modification of the holding member illustrated in FIG. 7.

FIG. 14 shows a modification of the holding member 21. The holding member 21 is similar to that mentioned above except that the base portion 21a does not have the cutout portion 21f.

The above-mentioned optical connector 1 may be used as an optical connection apparatus for connecting an optical cable to a small-sized optical component fixed to a substrate, such as an optical semiconductor module. Further, it is possible to reliably maintain a fitted state of the optical connector 1, to inhibit the rotation of the ferrule 11, to maintain a stable performance, and to reduce the size. Further, the optical connector is excellent in operability because the optical connector can be easily engaged with and disengaged from the housing without using a special tool.

While the invention has been particularly shown and described with reference to an exemplary embodiment thereof, the invention is not limited to these embodiments. It will be understood by those of ordinary skill in the art that various changes in form and details may be made therein without departing from the spirit and scope of the present invention as defined by the claims.

What is claimed is:

1. An optical connector comprising a ferrule defining an optical axis and a holding member holding the ferrule, wherein:
   the ferrule includes a flange portion having a positioned portion;
   the holding member including:
   a first beam portion;
   a second beam portion faced to the first beam portion;
   a third beam portion adjacent to the first and the second beam portions; and
   a fourth beam portion faced to the third beam portion;
   at least one of the first and the second beam portions being elastically bendable; at least one of the third and the fourth beam portions being elastically bendable;

at least one of the first and the second beam portions including a contacting portion contacted with the flange portion in an optical axis direction parallel to the optical axis and holding the ferrule;

at least one of the third and the fourth beam portions including a positioning portion engaged with the positioned portion to prevent the ferrule from being rotated; and at least one of the first and second beam portions including an operating portion for disengaging the positioned portion and the positioning portion from each other.

2. The optical connector according to claim 1, wherein the operating portion is elastically bendable contacted with the flange portion in a radial direction and faced to the at least one of the third and the fourth beam portions having elasticity.

3. The optical connector according to claim 2, wherein the operating portion is displaced in the radial direction in compliance with deformation of the at least one of the first and the second beam portions, thereby deforming the at least one of the third and the fourth beam portions.

4. The optical connector according to claim 1, wherein each of the third and the fourth beam portions has a neck portion having a narrow width and a coupling portion adjacent to an end of the neck portion and greater in width than the neck portion.

5. The optical connector according to claim 4, wherein the neck portions of the third and the fourth beam portions are different in length in the optical axis direction.

6. The optical connector according to claim 1, wherein the holding member includes a base portion coupling the first through the fourth beam portions, the base portion having a through hole allowing the ferrule to penetrate therethrough and a cutout portion connected to the through hole.

7. The optical connector according to claim 1, wherein the positioned portion has a cutout portion formed on the flange portion, the positioning portion having a cantilevered portion inserted into the cutout portion and being elastically bendable.

8. An optical connector apparatus comprising an optical connector according to claim 1 and a housing coupled to the optical connector.

9. The optical connector apparatus according to claim 8, wherein the housing comprises:
a housing body; and
a fitting portion protruding from the housing body in the optical axis direction;
the first through the fourth beam portions having a structure faced to an outer peripheral surface of the fitting portion and engaged with the fitting portion in the optical axis direction.

* * * * *